(12) United States Patent
Kim et al.

(10) Patent No.: US 7,865,657 B2
(45) Date of Patent: Jan. 4, 2011

(54) MULTI-CHIP FLASH MEMORY DEVICE AND COPY-BACK METHOD THEREOF

(75) Inventors: In-Young Kim, Seoul (KR);
Young-Joon Choi, Seongnam-si (KR);
Jong-Hwa Kim, Hwaseong-si (KR);
Soon-Young Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1041 days.

(21) Appl. No.: 11/646,500

(22) Filed: Dec. 28, 2006

(65) Prior Publication Data
US 2008/0082730 A1 Apr. 3, 2008

(30) Foreign Application Priority Data
Oct. 3, 2006 (KR) ...................... 10-2006-0097467

(51) Int. Cl.
*G06F 12/00* (2006.01)
(52) U.S. Cl. ...................... 711/103; 711/157; 711/162; 711/168; 711/169
(58) Field of Classification Search ................. 711/103, 711/157, 162, 168–169
See application file for complete search history.

(56) References Cited

U.S. PATENT DOCUMENTS

| | | | |
|---|---|---|---|
| 5,748,535 A | 5/1998 | Lin et al. | |
| 5,862,099 A | 1/1999 | Gannage et al. | |
| 6,040,997 A | 3/2000 | Estakhri | |
| 7,159,069 B2 * | 1/2007 | Adusumilli et al. | ......... 711/103 |

FOREIGN PATENT DOCUMENTS

| | | |
|---|---|---|
| JP | 2005-216434 | 8/2005 |
| KR | 10-2000-0031036 | 6/2000 |
| KR | 10-2003-84702 | 11/2003 |
| KR | 10-2005-78206 | 8/2005 |
| KR | 10-2006-0020299 | 3/2006 |
| KR | 10-2006-78787 | 7/2006 |

* cited by examiner

*Primary Examiner*—Jasmine Song
(74) *Attorney, Agent, or Firm*—Harness, Dickey & Pierce, P.L.C.

(57) ABSTRACT

A method and device for copying-back data in a multi-chip flash memory device having first and second memory chips. The method may include reading first source data from a first source region of one of the memory chips; programming the first source data into a target region included in one of the memory chips and reading second source data from second source region of the other memory chip different from the memory chip including the target region. Reading the second source data may be carried out while programming the first source data.

19 Claims, 10 Drawing Sheets

MULTI-CHIP FLASH MEMORY DEVICE AND COPY-BACK METHOD THEREOF

PRIORITY STATEMENT

This U.S. non-provisional patent application claims priority under 35 U.S.C. §119 of Korean Patent Application No. 2006-97467 filed on Oct. 3, 2006, the entire contents of which are hereby incorporated by reference.

BACKGROUND

1. Field

Example embodiments disclosed herein relate to memory devices, for example, flash memory devices, for example, to a multi-chip flash memory device and copy-back method thereof.

2. Description of Related Art

Recently, applications of volatile and nonvolatile memories are increasing for mobile apparatuses, for example, MP3 players, personal multimedia players (PMP), mobile phones, notebook computers, personal digital assistants (PDA), and so on. Such mobile apparatuses may require storage units with greater storage capacity in order to provide various functions (e.g., playing motion pictures). To meet this demand there is a scheme of multi-bit package in which pluralities of memory devices are constructed in a single package. A multi-chip package may be helpful to reduce a package size by about half a normal package type by stacking memory chips of the same kind. A multi-chip flash memory device may be composed of two or more chips using individual chip selection signals that are different from each other. A multi-chip flash memory device may also be organized with pluralities of chips sharing the same chip selection signal.

FIG. 1 is a block diagram schematically showing an example architecture for copy-back in a conventional dual-chip flash memory device. Referring to FIG. 1, each of two memory chips 10 and 20 may include a cell array formed of pages, each of which may be a unit of programming and reading. Each memory chip may include page buffers PB1 and PB2 functioning as write drivers during a programming operation or as sense amplifiers during a reading operation. The memory chips 10 and 20 may share a chip selection signal CS, a read enable signal nRE, and/or a write enable signal nWE. The memory chips 10 and 20 may also share an input/output (I/O) bus 30.

FIG. 2 is a timing diagram schematically showing an intra-chip copy-back operation in the conventional flash memory device shown in FIG. 1. A sequence of the copy-back operations may correspond to the reference numerals ①~⑧ of FIG. 1. Referring to FIG. 2, the page buffer PB1 may read source data from a source page Page 1 for the copy-back operation (①). The read source data may be provided to a memory controller 40 by way of the input/output bus 30 shared by the chips (②). The read source data for copy-back may be stored in a SRAM included in the memory controller 40. The source data stored in the SRAM may be corrected by an algorithm with error correction codes (ECC). The memory controller 40 may re-input the read source data to the first memory chip 10 and loaded into the page buffer PB1 (③) in order to program the read source data in a target page Page2. The loaded source data loaded in the page buffer PB1 may be programmed into the target page Page2 (④). Completion of the programming operation is detected through a status check operation conducted by the memory controller 40. The intra-chip inter-page copy-back operation carried out in the first memory chip 10 may also be applicable to the second chip 20 (⑤~⑧).

FIGS. 3 and 4 are block and timing diagrams for illustrating an inter-chip copy-back operation in a conventional dual-chip flash memory device. FIG. 3 shows a dual-chip flash memory device with the same organization and function as in FIG. 1, in which a copy-back operation is carried such that a source page is allocated to the first memory chip 10, while a target page is allocated to the second memory chip 20. Source data copied back may be read out, transferred, and/or programmed through the procedure of ①~⑧. An operation in FIG. 3 will be described with reference to the timing diagram shown in FIG. 4. For a copy-back operation from the source page Page1 to a target page Page3, the page buffer PB1 may read source data from the source page Page1 (①). The read source data may be transferred to the memory controller 40 by way of the input/output bus 30 shared by the chips (②). The source data processed with error correction by the memory controller 40 may be input to the page buffer PB2 by way of the input/output bus 20 and an input/output line I/O_2 of the second memory chip (③). The page buffer PB2 may program the source data into the target page Page3 (④). A copy-back operation from a source page Page2 to a target page Page4 may be carried out through ⑤~⑧ in the same procedure of ①~④.

According to such copy-back operations between pages of chips and between chips, an operation for reading the source page and an operation for writing data into the target page from the source page are performed sequentially. Sequential reading and programming operations may prevent data collision while inputting/outputting the source data while sharing the input/put bus 30 by the chips.

SUMMARY

Example embodiments may provide a copy-back method for enhancing an operation speed of a multi-chip memory device, for example, a multi-chip flash memory device.

Example embodiments may provide a multi-chip flash memory device capable of conducting a higher-frequency copy-back operation by sharing an input/output bus and/or control pins.

Example embodiments may provide a method of copying-back data in a multi-chip flash memory device having first and second memory chips, including reading first source data from a first source region of one of the memory chips, programming the first source data into a target region included in one of the memory chips, and reading second source data from second source region of the other memory chip different from the memory chip including the target region. Reading the second source data may be carried out while programming the first source data.

In example embodiments, when the first source region and the target region are included in the first memory chip, the second source region may be included in the second memory chip.

In example embodiments, preparing the first source data may include detecting whether the first source data have been programmed into the target region.

In example embodiments, when the first source region is included in the first memory chip and the target region is included in the second memory chip, the second source region may be included in the first memory chip.

In example embodiments, programming the first source data may include detecting whether the first source data have been programmed into the target region.

In example embodiments, the first and second source regions and the target region are correspondent each with data storage regions each of which is a unit of page.

In example embodiments, the method may further include correcting errors of the first and second source data read out.

In example embodiments, the first and second memory chips may be NAND flash memory devices.

Example embodiments may provide a multi-chip flash memory device including a first memory chip, a second memory chip, and a memory controller programming a target region of one of the first and second memory chips with first source data read out from the first memory chip during a copy-back operation, and regulating the first and second memory chips to read second source data from a second source region of the other memory chip different from the memory chip including the target region during a period of the programming.

In example embodiments, the first and second memory chips may share a chip selection signal.

In example embodiments, the first and second memory chips may be alternatively selected in accordance with a level of the chip selection signal.

In example embodiments, the memory controller may execute an error correction operation for the first and second source data.

Example embodiments may provide a multi-chip flash memory device may include an input/output bus, a first memory chip, during programming, providing status data, which informs about completion of the programming in response to a status detection command and a read enable signal, a second memory chip, during the programming, conducting a read to output read data to the input/output bus, before outputting the status data, in response to a read command and interrupting a data output to the input/output bus at an output time of the status data, and a memory controller providing the first and second memory chips with the status detection command, the read command, and an address by way of the input/output bus and conducting a copy-back operation in accordance with the programming and reading.

In example embodiments, the first and second memory chips may share a chip selection signal, a write enable signal, and a read enable signal which are provided from the memory controller.

In example embodiments, the first and second memory chips may alternatively selected in accordance with a level of the chip selection signal.

In example embodiments, the first memory chip may include a first cell array, a first input/output buffer storing the status data, and a first control logic block conducting the programming for the first cell array in response to an address, a write enable signal, and/or a read enable signal and regulating to output the status data in response to the status detection command.

In example embodiments, the first control logic block may include a first buffer controller activating an output of the first input/output buffer in response to the status detection command and the address.

In example embodiments, the second memory chip may include a second cell array, a second input/output buffer storing the read data, and a second control logic block conducting the reading for the second cell array in response to an address, a write enable signal, and/or a read enable signal and regulating an output of the second input/output buffer in response to the status detection command.

In example embodiments, the second control logic block may include a second buffer controller interrupting the output of the second input/output buffer in response to the status detection command.

According to example embodiments, a reading operation for copy-back may be carried out in one chip while a programming operation is carried out in another chip. Thus, a speed of the copy-back operation may be increased.

A further understanding of the nature and advantages of example embodiments herein may be realized by reference to the remaining portions of the specification and the attached drawings.

BRIEF DESCRIPTION OF THE FIGURES

Non-limiting and non-exhaustive example embodiments will be described with reference to the following figures, wherein like reference numerals refer to like parts throughout the various figures unless otherwise specified. In the figures.

DETAILED DESCRIPTION OF EXAMPLE EMBODIMENTS

Figure 1:
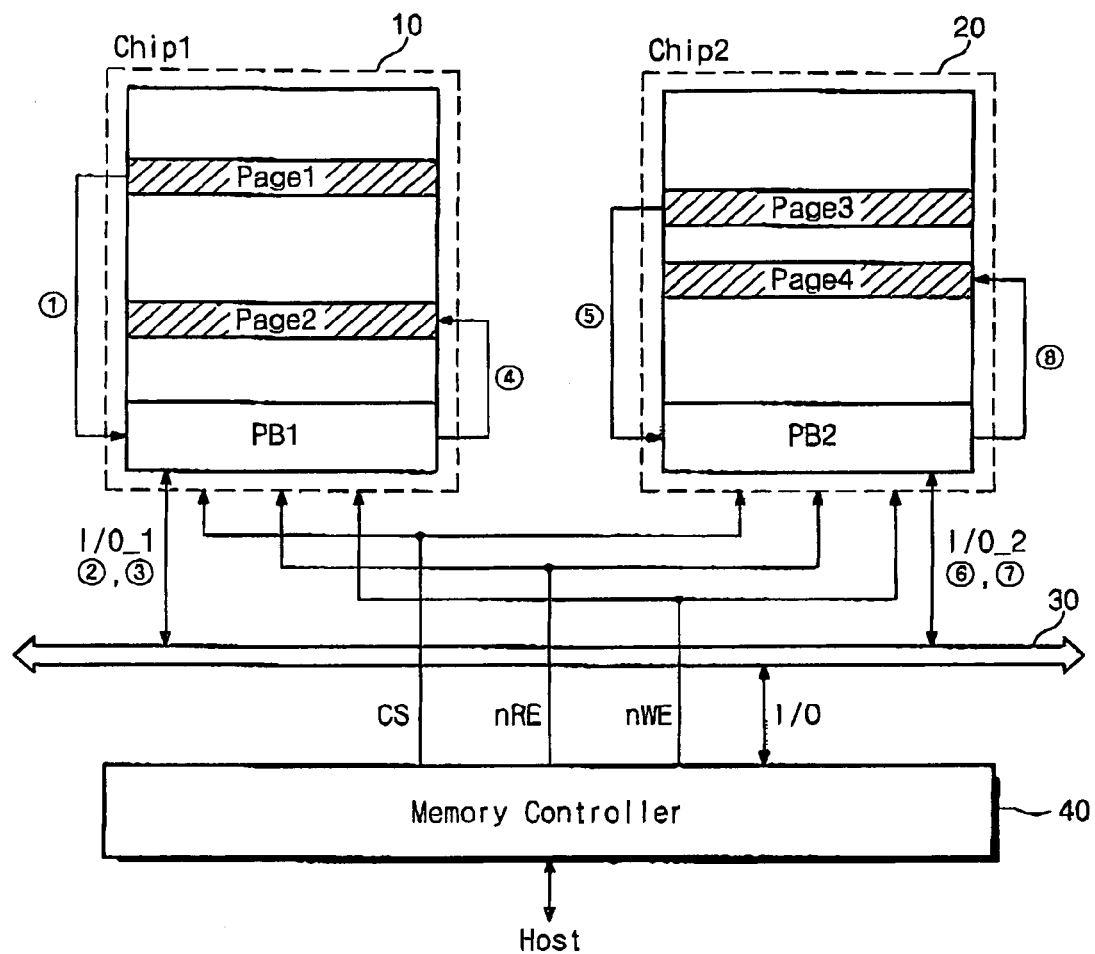
FIG. 1 is a block diagram schematically showing architecture for copy-back in a conventional dual-chip flash memory device.
Figure 2:
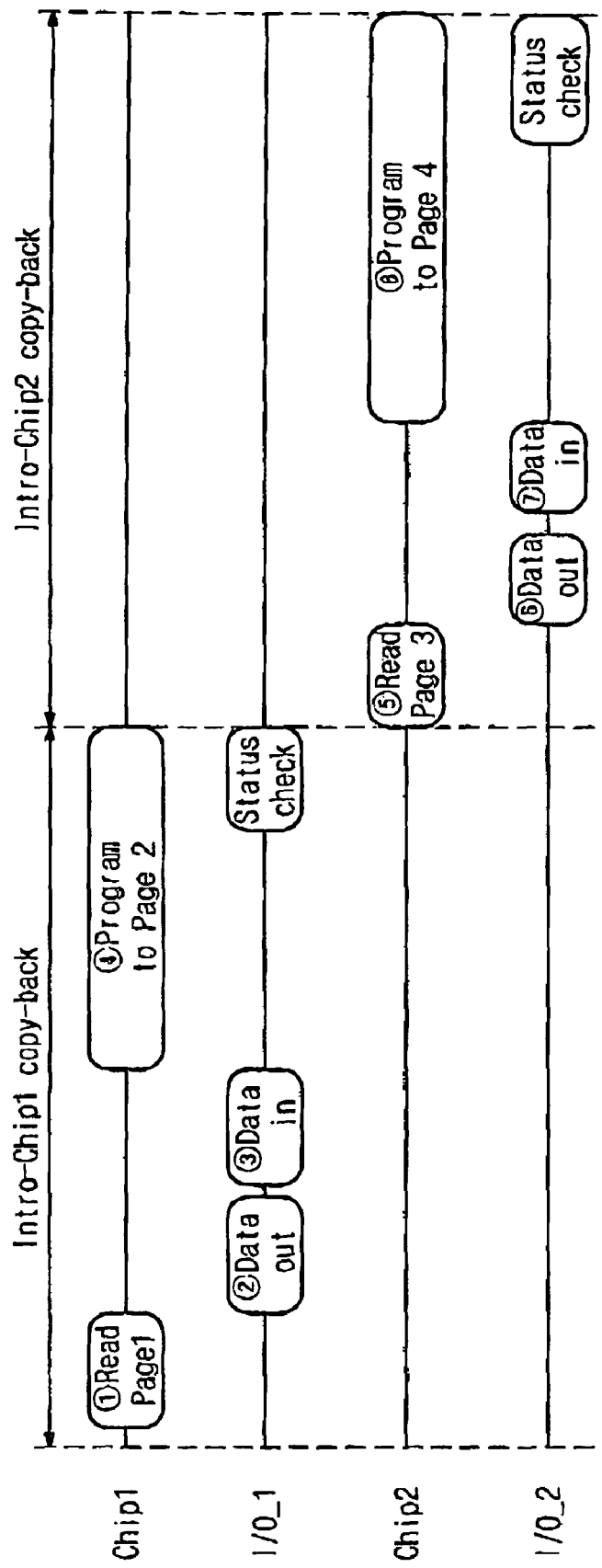
FIG. 2 is a timing diagram schematically showing an intro-chip copy-back operation in the conventional flash memory device shown in FIG. 1.
Figure 3:
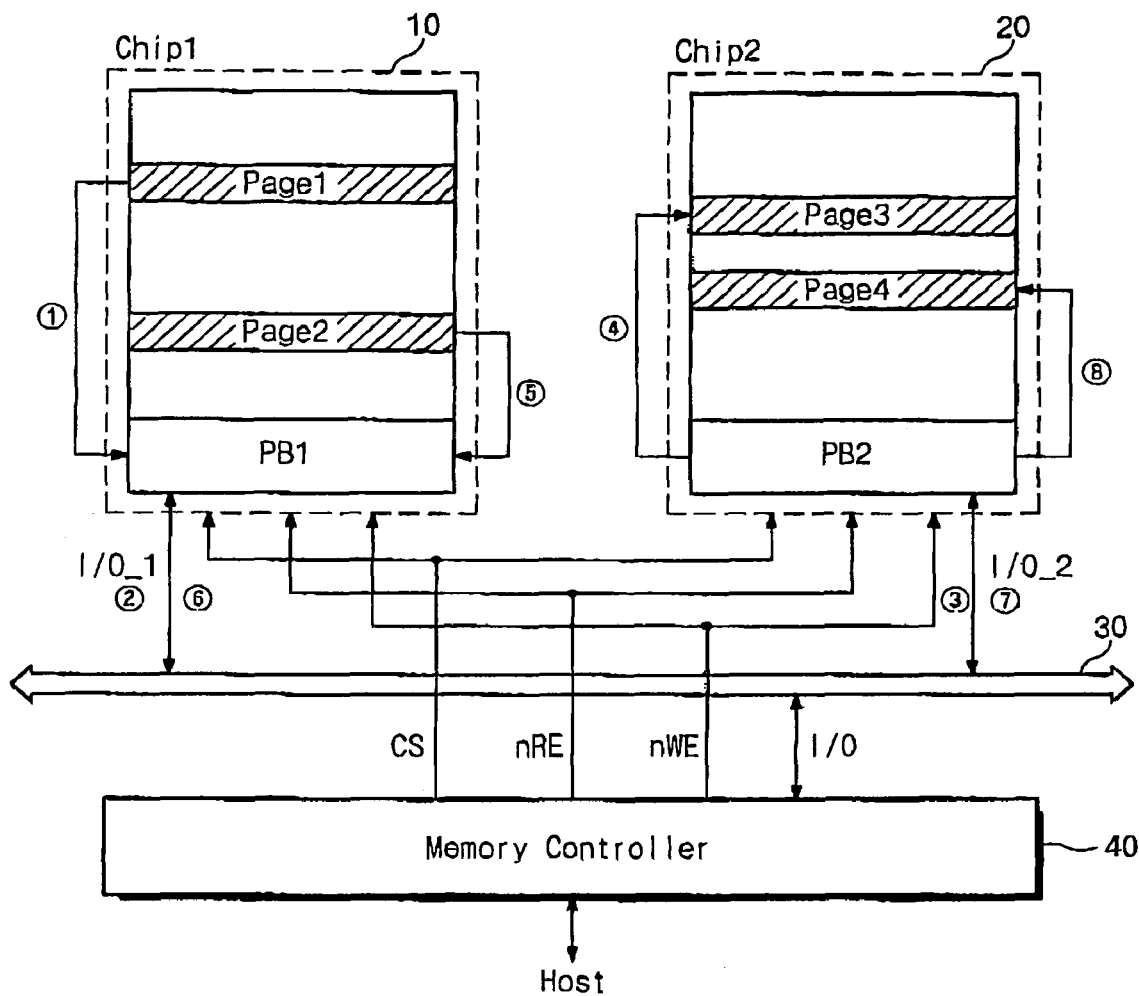
FIG. 3 is a block diagram schematically showing functional organization for an inter-chip copy-back operation in a conventional dual-chip flash memory device.
Figure 4:
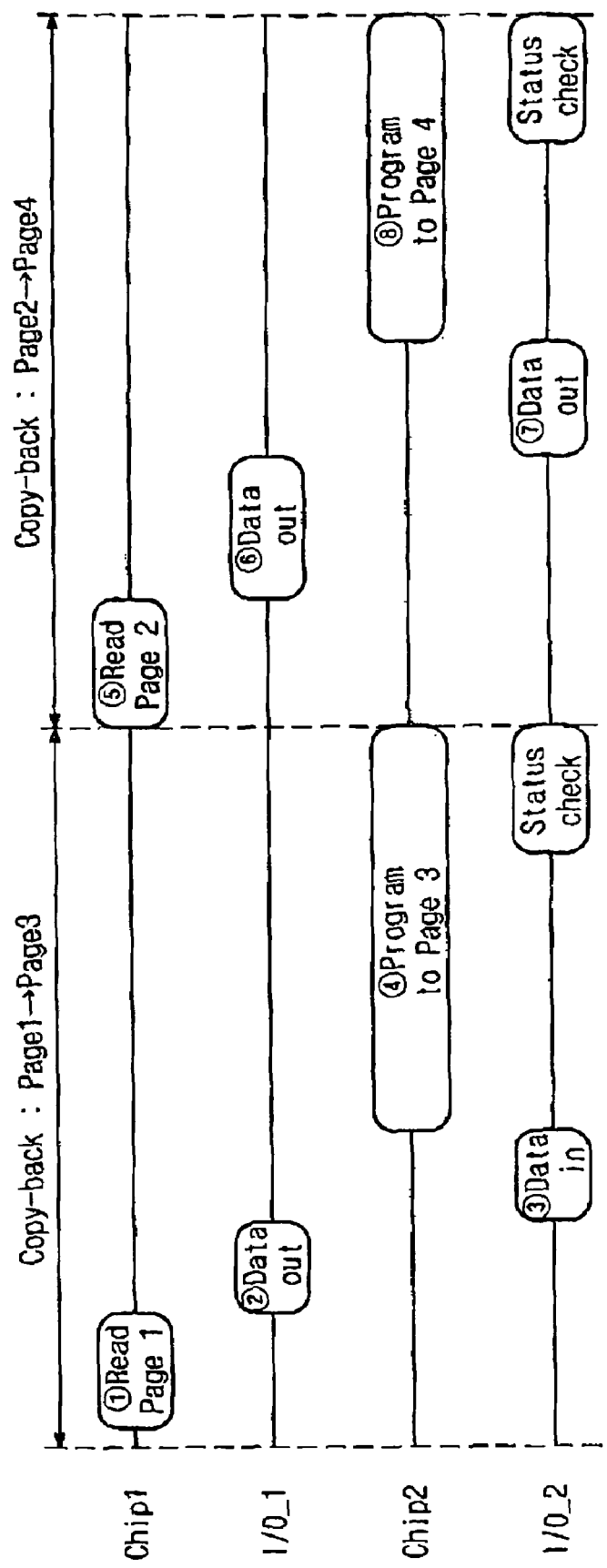
FIG. 4 is a timing diagram illustrating an inter-chip copy-back operation in the conventional flash memory device shown in FIG. 3.

Example embodiments will be described below in more detail with reference to the accompanying drawings. Like reference numerals refer to like elements throughout the accompanying figures.

Various example embodiments will now be described more fully with reference to the accompanying drawings in which some example embodiments are shown. In the drawings, the thicknesses of layers and regions may be exaggerated for clarity. Detailed illustrative example embodiments are disclosed herein. Specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between" and/or "adjacent" versus "directly adjacent").

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the scope of example embodiments.

Spatially relative terms, such as "beneath", "below", "lower", "above", "upper" and the like, may be used herein for ease of description to describe one element or a feature's relationship to another element or feature as illustrated in the Figures. It will be understood that the spatially relative terms are intended to encompass different orientations of the device in use or operation in addition to the orientation depicted in the Figures. For example, if the device in the Figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In example embodiments, flash memory chips are used as an example for illustrating structural and operational features. Further, example embodiments may use a multi-chip flash memory device including two memory chips sharing a chip selection signal CS. In the case of sharing the chip selection signal CS, while the two memory chips receive the chip selection signal CS, an alternative one of them is complementarily selected in response to a voltage level of the chip selection signal CS. Other example embodiments may, however, be embodied in different forms and should not be constructed as limited to example embodiments set forth herein. Rather, example embodiments are provided so that this disclosure will be thorough and complete, and will fully convey the scope of the appended claims to those skilled in the art.

In a copy-back mode in accordance with example embodiments, a copy-back operation with a condition that source and target pages are included in the same chip may be referred to as 'intra-chip copy-back operation'. A copy-back operation with a condition a source page is included in a chip while a target page is included in the other chip is referred to as 'inter-chip copy-back operation'.

Figure 5:
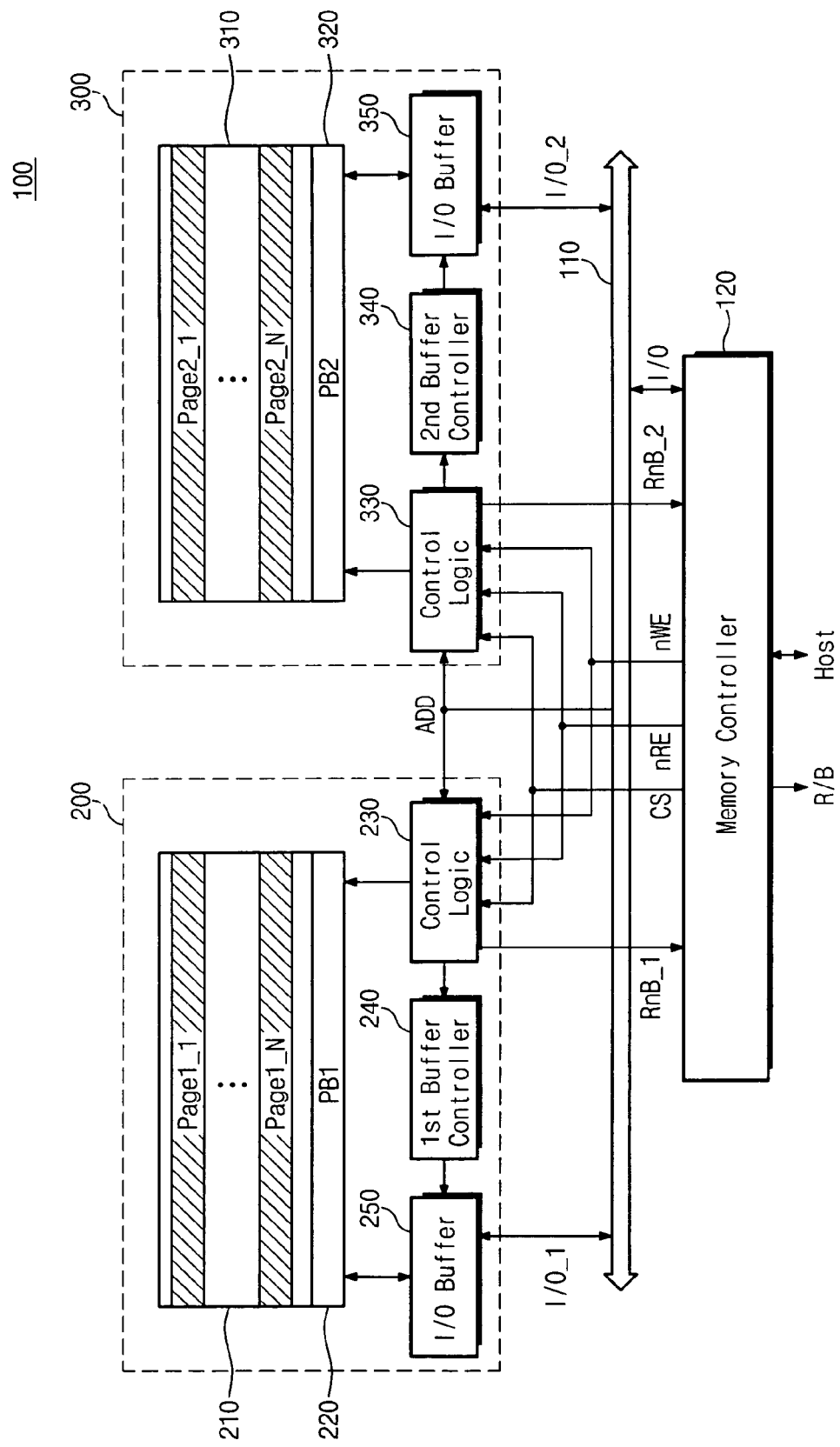
FIG. 5 is a block diagram schematically illustrating a multi-chip flash memory device in accordance with example embodiments.

FIG. 5 is a block diagram schematically illustrating a multi-chip flash memory device 100 in accordance with the example embodiments. Referring to FIG. 5, the flash memory device 100 may include first and second memory chips 200 and 200 sharing a chip selection signal CS, a read enable signal nRE, and/or a write enable signal nWE. The memory chips 200 and 300 may include control logic blocks 230 and 330 regulating data input/output operations in response to the control signals CS, nRE, and nWE, respectively. The memory chips 200 and 300 may also include first and second buffer controllers 240 and 340 regulated to prevent data collision on an input/output bus 110.

The first memory chip 200 may include a cell array 210, and a page buffer 220 connected to bit lines of the cell array 210. The page buffer 220 may latch data from an input/output (I/O) buffer 250 in units of a page in response to regulation by the control logic block 230 and program the latched data into the cell array 210. The page buffer 220 may sense and amplify data of a selected page from the cell array 210 and transfer the sensed and amplified data to the input/output buffer 250.

The control logic block 230 may operate to regulate the first buffer controller 240 and the page buffer 220 in response to the control signals CS, nRE, and nWE and an address ADD. During a programming operation, when the chip selection signal CS is input to select the first memory chip 200, the control logic block 230 may regulate the page buffer 220 to load data from the input/output buffer 250. The control logic block 230 may also regulate programming circuits (not shown) of the memory chip to write program data into a selected page. During a reading operation, the control logic block 230 may latch data of a selected page into the page buffer 220 in response to an address ADD, the chip selection signal CS, and the read enable signal nRE. The control logic block 230 may regulate the first buffer controller 240 to output the latched read data from the page buffer 220 to the memory controller 120 by way of the input/output buffer 250 and the input/output bus 110. The control logic block 230 may also generate a ready/busy signal RnB_1 indicating an internal operation state and transfer the ready/busy signal RnB_1 to the memory controller 120.

The first buffer controller 240 may regulate an output time of the input/output buffer 250 in response to regulation by the control logic block 230. In the multi-chip flash memory device sharing the I/O bus 110 between the first and second memory chips 200 and 300, the first buffer controller 240 may regulate the input/output buffer 250 to prevent collision between data of the first and second memory chips 200 and 300. The first buffer controller 240 may also regulate output points of read data taken from the cell array 210 and status data representing a write-in state of input data, which are loaded in the input/output buffer 250.

A cell array 310, a page buffer, the control logic block 330, the second buffer controller 340, and an input/output buffer 350, of the second memory chip 300 may have the same configuration, structure and function as the corresponding components of the first memory chip 200.

The I/O bus 110 may be shared by the first and second memory chips 200 and 300 in the multi-chip flash memory device 100. Thus, data and addresses may be transferred from a host to the first and second memory chips 200 and 300 in common. The control logic blocks 230 and 330 may selectively regulate data input/output operations in accordance with a voltage level of the chip selection signal CS. When data are output from the first and second memory chips 200 and 300 at the same time, there may be a data collision. Thus, the data output operations respective from the memory chips 200 and 300 should be controlled in the multi-chip flash memory device 100.

The memory controller 120 may program data into the memory chips 200 and 300, in response to a command provided from the host, and transfers data to the host from the memory chips. In a copy-back operation according to example embodiments, an operation of error correction is carried out on data read out from a source page. The memory controller 120 may regulate the memory chips to reprogram error-corrected source data into a target page. For the error correction operation, the memory controller 120 may include an ECC block containing an SRAM and error correction codes. In addition, the memory controller 120, during the copy-back operation for programming copy-back data into a target page of one of the memory chips, may execute an interleaving operation for reading source data from the other memory chip. Hereinafter, the copy-back operation, in which a reading operating is carried out for taking source data from one memory chip while programming data into the other memory chip, is referred to as 'interleaving copy-back operation'. Interleaving copy-back operation may be possible because a time for programming a unit of page data is much shorter than a time for reading a unit of page data. Although the memory chips share the control pins nRE, nWE, and CS and the I/O bus 110, it is permissible to provide one memory chip with commands, addresses, and control signals for a reading operation even during a programming operation in the other memory chip. Further, it is possible to store source data in the memory controller 120 from the cell array in response to the read command.

With the aforementioned structure, the multi-chip flash memory device of example embodiments is able to perform the interleaving copy-back operation without data collision on the I/O bus 110 shared by the memory chips.

Figure 6:
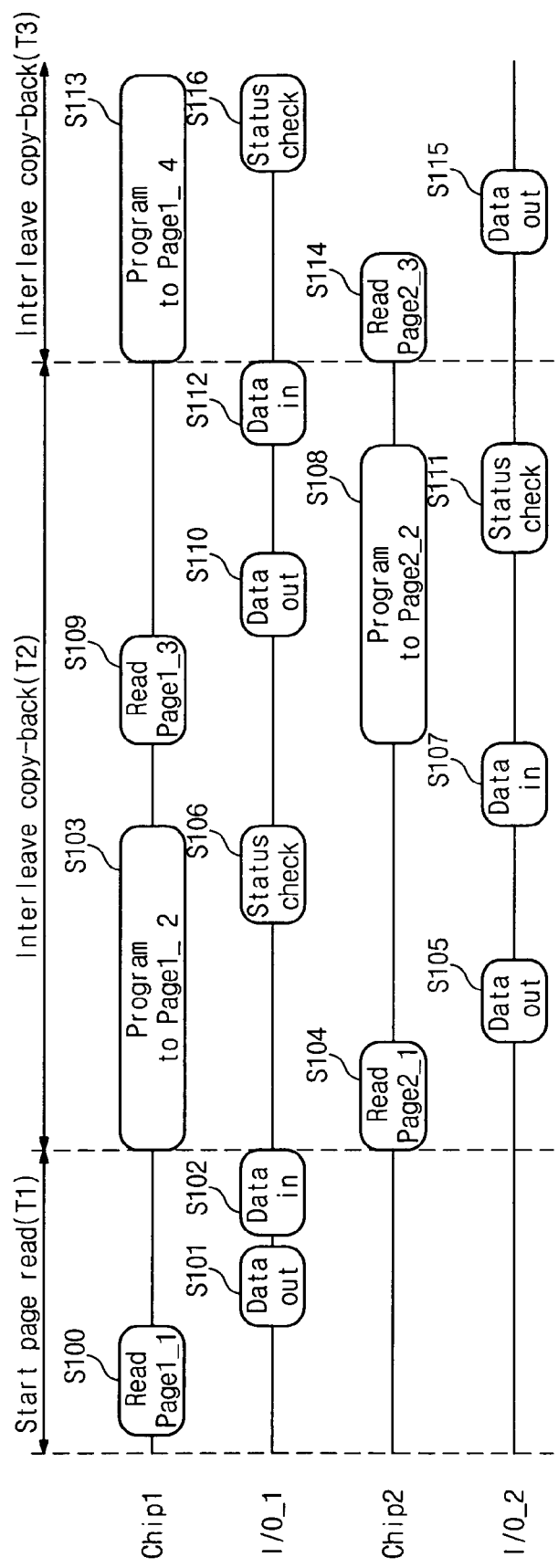
FIG. 6 is a timing diagram showing an intro-chip interleaving copy-back operation in accordance with example embodiments.

FIG. 6 is a timing diagram showing the interleaving copy-back operation for which programming and reading operations are carried out at the same time in the multi-chip flash memory device of example embodiments. For example, FIG. 6 illustrates an intra-chip interleaving copy-back operation for internally transferring data from a source page to a target page in one of the memory chips. Referring to FIG. 6, in the beginning of the copy-back operation, reading a start page for the interleaving mode may be carried out for a period T1. First source data may be read out from a source page Page1_1 of the first memory chip 200 and latched in the page buffer 220 (S100). The first source data latched in the page buffer 220 may be transferred to the memory controller 120 by way of the input/output buffer 150 and the I/O bus 110 (S101). The first source data processed by the memory controller 120 may return to the first memory chip 200 through the I/O bus 110 (S102). The first source data input into the first memory chip 200 may be loaded into the page buffer 220 by way of the I/O buffer 250 and programmed into a target page Page1_2 (S103). At the same time when the first source data are programmed into the target page Page1_2 of the first memory chip 200, reading second source data from a source page of the second memory chip 300 may be carried out. Reading may be conducted by inputting a read command and address through I/O pins in sync with toggling of the write enable signal nWE. The control logic block 330 may latch the second source data into the page buffer 320 from a selected page Page2_1 in response to the input address and read command (S104). The second source data may be output to the memory controller 120 in a period of programming (S103) for the first memory chip 200 (S105) and proceeds with checking whether the first source data have been completely written (or programmed) into the first memory chip 200 (S106). If status data is output to indicate that the programming has been completed, the copy-back operation in the first memory chip 200 may be terminated. Second source data stored in the memory controller 120 may be input to the second memory chip 300 (S107). The second memory chip 300 may load the second source data into the page buffer 320 and conduct programming for the second source data into a target page Page2_2 (S108). During a period of programming the second source data into the target page Page2_2, another read command and address for reading third source data may be input to I/O terminals I/O_1 of the first memory chip 200. The third source data, corresponding to the input read command and address, may be latched in the page buffer 220 (S109). The third source data latched in the page buffer 220 may be output to the memory controller 120 by way of the I/O buffer 250 and the I/O bus 110 (S110). Completion of the programming for the second source data in the second memory chip 300 may be output as status data to the I/O bus 110 through a status check operation (S111). In case of succeeding copy-back operations, the interleaving mode is repeated such that source data are read from one of the memory chips while programming the other memory chip. Namely, operations S112~S117 may be continued in the interleaving copy-back mode as aforementioned.

Figure 7:
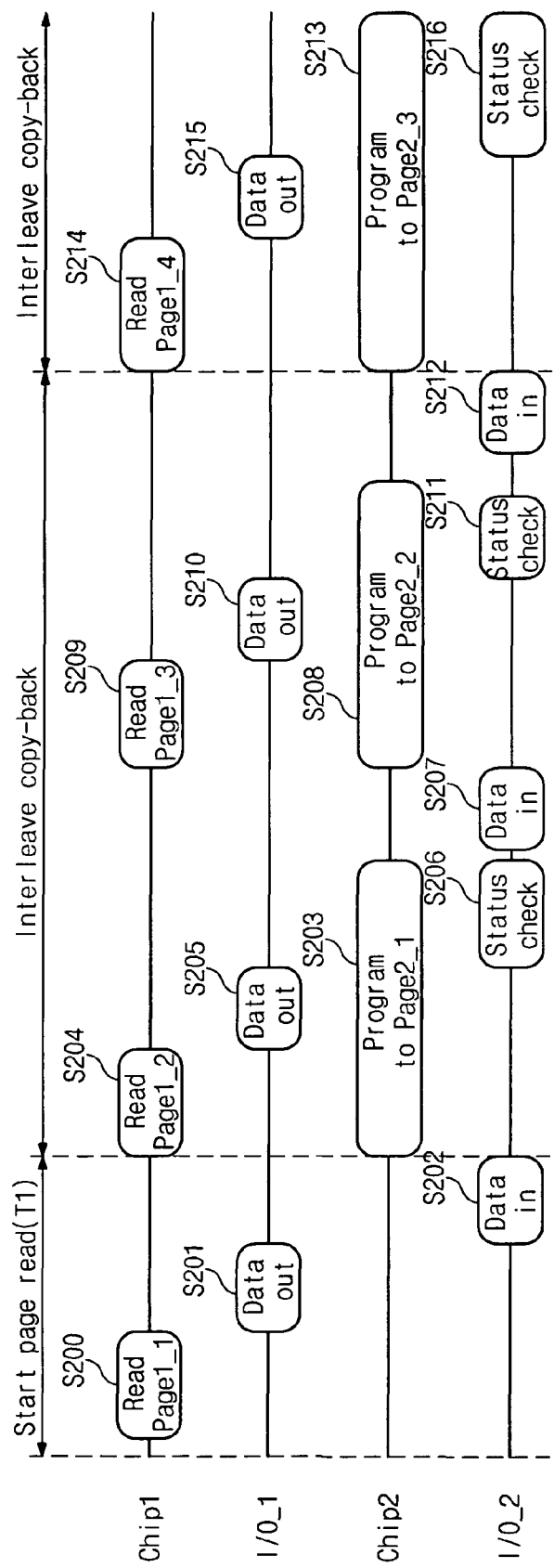
FIG. 7 is a timing diagram showing an inter-chip interleaving copy-back operation in accordance with example embodiments.

FIG. 7 is a timing diagram showing an interleaving copy-back operation transferring data between the memory chips in accordance with example embodiments. For example, FIG. 7 shows an overall feature of operation in the copy-back mode from the first memory chip 200 to the second memory chip 300. Referring to FIG. 7, in the beginning of the inter-chip copy-back operation, reading a start page for the interleaving mode may be carried out for a period T1. First source data may be read out from a source page Page1_1 of the first memory chip 200 and latched in the page buffer 220 (S200). The first source data latched in the page buffer 220 may be transferred to the memory controller 120 by way of the input/output buffer 250 and the I/O bus 110 (S201). The first source data transferred to the memory controller 120 may be input into the page buffer 320 of the second memory chip 300 by way of the I/O buffer 250 shared by the memory chips (S202). The first source data may be programmed into a target page Page2_1 of the second memory chip 300 (S203). While programming the first source data into the second memory chip 300, the memory controller 120 may read second source data from the first memory chip 200 and stores the second source data therein (S204 and S205). After programming the first source data into the target page Page2_1 of the second memory chip 300 (S206), the memory controller 120 may load the page buffer 320 with the second source data stored therein (S207). The second source data loaded into the page buffer 320 may be written (or programmed) into another target page Page2_2 (S208). During the period of programming the second source data (S208), the memory controller 120 may provide a command and address for reading third source data from the first memory chip 200 (S209). The third source data read out from the first memory chip 200 may be stored in an SRAM (not shown) included in the memory controller 120 (S210). If a status check operation determines that the second source data haven been completely programmed (S211), the memory controller 120 provides the second memory chip 300 with the third source data stored therein (S211). For successive copy-back operations, the interleaving copy-back operation may be repeated such that source data are read from one of the memory chips while programming the other memory chip. Namely, operations S112~S117 may be continued in the interleaving copy-back mode as aforementioned.

According to the intra-chip or inter-chip interleaving copy-back mode, while programming data into one memory chip, the other memory chip may conduct a reading operation. Thus, a time for the copy-back operation is shortened. Further, as illustrated in FIGS. 6 and 7, even though the memory chips share the control signals CS, nWE, and nRE and the I/O bus 110, they do not occupy the I/O terminals I/O_1 and I/O_2 at the same time.

Figure 8:
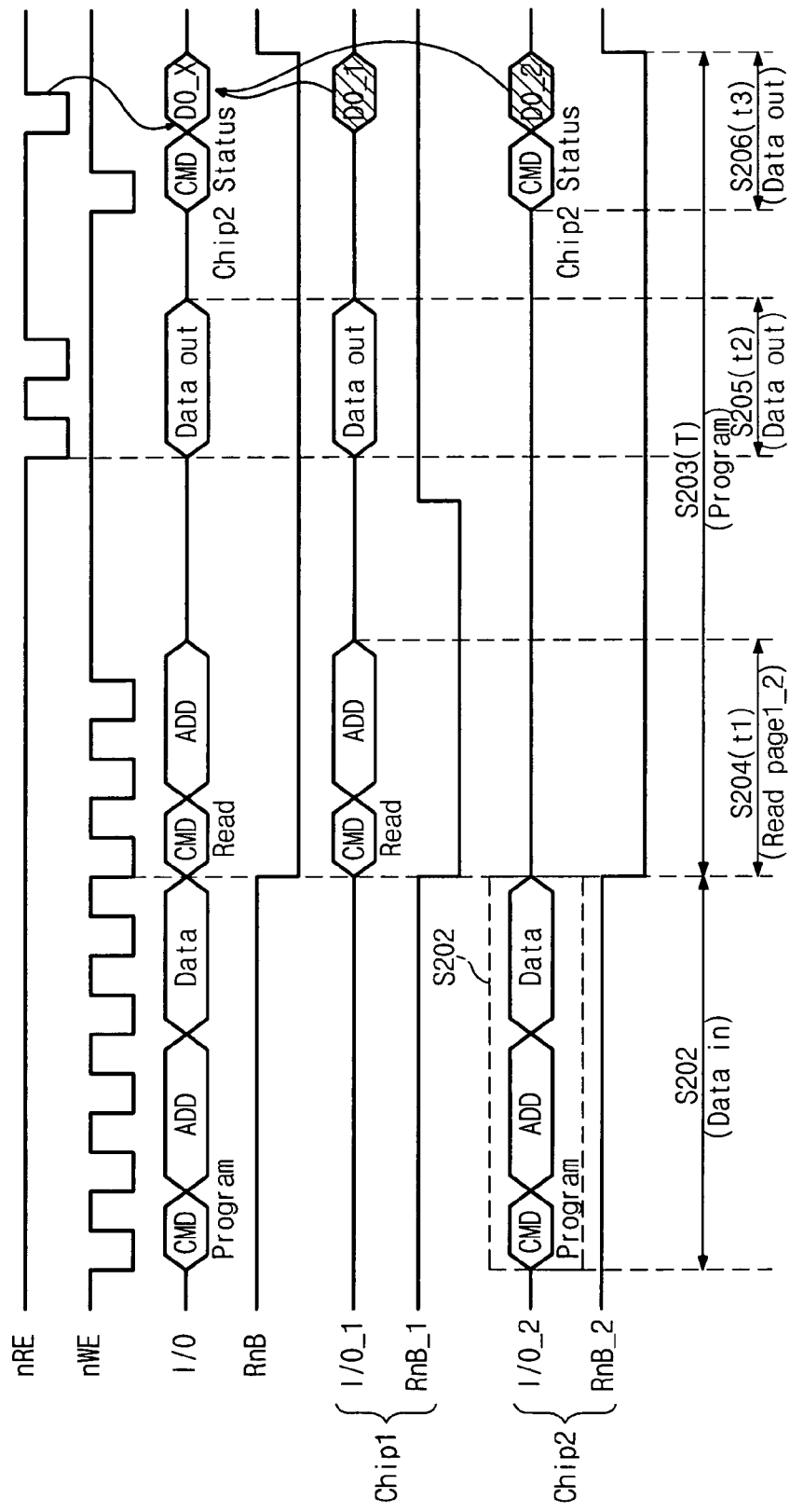
FIG. 8 is an example timing diagram showing problems that may arise from the interleaving copy-back operation.

FIG. 8 is a timing diagram showing problems that would arise partially from periods of the interleaving copy-back operation shown FIG. 7. For example, FIG. 8 illustrates operational errors which may be generated from the I/O bus 110 throughout S202 to S206. Referring to FIG. 8, the memory controller 120 may input the program command CMD, the address ADD, and the first source data to the second memory chip 300 (S202). The second memory chip 300 may program the first source data into the target page for a programming period T in response to an operation of the memory controller 120 (S203). At the same time as programming the first source data, the memory controller 120 may provide the first memory chip 200 with the read command and address CMD and ADD, through the I/O bus 110, for reading the second source data (S204). Responding to the read command and address, the second source data loaded in the page buffer 220 may be output to the memory controller 120 by way of the I/O bus 110 after a predetermined or desired time (S205). For outputting the second source data, the memory controller 120 may toggle the read enable signal nRE twice. The second source data input from the page buffer 220 to the I/O buffer 250 may be output to the memory controller 120 through the I/O bus. Reading the second source data (S204) and outputting the second source data to the memory controller 120 (S205) may be carried out in the programming period T for the first source data. And, responding to a status detection command (Chip2 Status CMD) to check completion of programming for the first source data, status data DO_2 may be output to the I/O bus 110 through the I/O terminals I/O_2 of the second memory chip 300 (S206). For outputting the status data DO_2, the memory controller 120 may toggle the read enable signal nRE once. As the read enable signal nRE is shared by the first and second memory chips 200 and 300, the status data DO_2 stored in the I/O buffer 350 of the second memory chip 300 and the second source data DO_1 stored in the I/O buffer 250 of the first memory chip 200 by the previous reading, may be transferred to the I/O bus 110 at the same time. As a result, the read data (e.g., the second source data) DO_1 and the status data DO_2, which are output at the same time during the interleaving copy-back operation, in response to the read enable signal nRE, may conflict on the I/O bus 110. This data DO_X of collision may cause a systemic error or malfunction.

Figure 9:
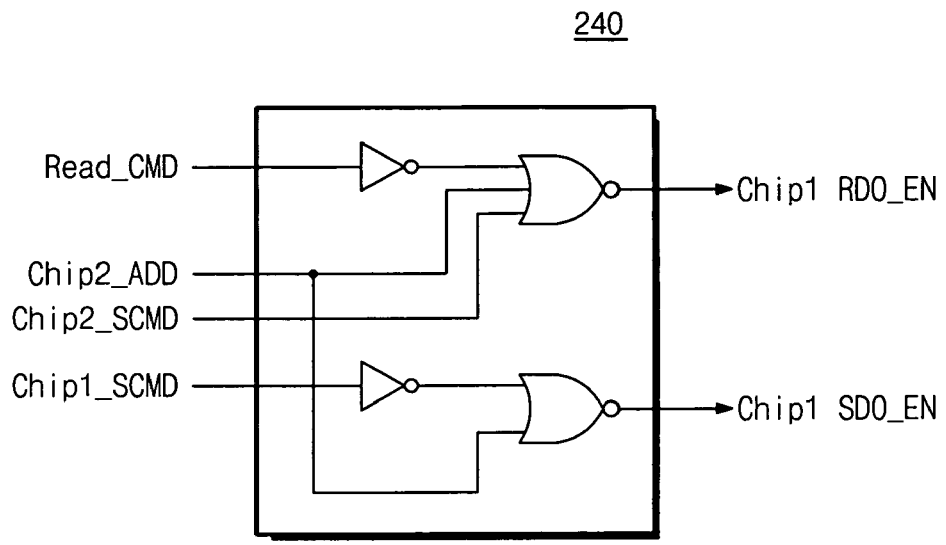
FIG. 9 is an example circuit diagram illustrating a first buffer controller.
Figure 10:
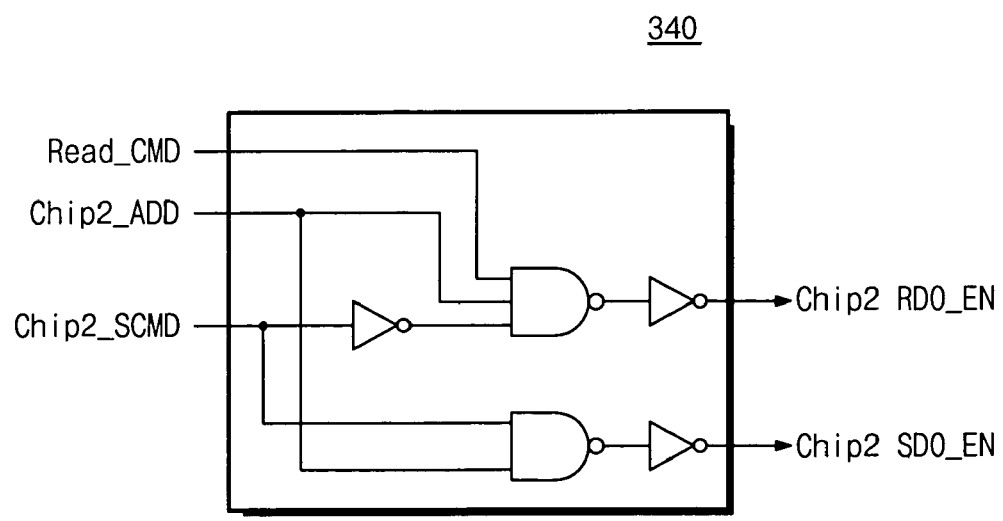
FIG. 10 is an example circuit diagram illustrating a second buffer controller.

FIGS. 9 and 10 show circuit configurations for reducing or preventing the data collision on the shared I/O bus 110 during the interleaving copy-back operation. FIG. 9 is an example circuit diagram illustrating the first buffer controller 240 of the first memory chip 200 shown in FIG. 5. The first buffer controller 240 may operate to regulate the output operations of the read and status data latched in the I/O buffer 250 in response to signals, Read_CMD, Chip2_ADD, Chip2_ADD, Chip2_SCMD, and Chip1_SCMD, transferred from control logic block 230. In order to provide the I/O bus 110 with the read data latched in the I/O buffer 250, a buffer control signal Chip1 RDO_EN may be activated from the first buffer controller 240. For this condition: the read command Read_CMD is set on '1' in binary value; the address signal Chip2_ADD may be set to '0'; and the signal Chip2_SCMD is set on '0'. The status data of the first memory chip 200 may be output when the signals Chip2_ADD and Chip1_SCMD are set to '0' and '1' respectively, in response to activation of the buffer control signal Chip1 SDO_EN.

FIG. 10 is an example circuit diagram illustrating the second buffer controller 340 of the second memory chip 300. The status data for the second memory chip 300 may be output when a buffer control signal Chip2 SDO_EN is activated. For outputting the status data, it may be necessary to transfer the status data command Chip2_SCMD and the address signal Chip2_ADD to the second memory chip 300 from the control logic block 330. For outputting the read data from the second memory chip 300, a read-data output enable signal Chip2 RDO_EN may be activated. For this condition: the read command Read_CMD may be set to '1'; the address signal Chip2_ADD may be set to '1'; and the status-data output command Chip2_SCMD may be set to '0'.

Summarizing the aforementioned operations and functions of the first and second buffer controllers, an output of the read data may be interrupted from the first memory chip 200 when there is an input of status data output command into the second memory chip 300. Thus, the first and second buffer controllers may operate to prevent data collision on the I/O bus 110 shared by the memory chips 200 and 300. The structure of the first and second buffer controllers 240 and 340 are examples, not restrictive hereto, but are alterable or modifiable in various modes. While the first and second buffer controllers 240 and 340 are illustrated and described as being confined each in the first and second memory chips 200 and 300, example embodiments are not also restrictive hereto. Namely, all functions of the first and second buffer controllers 240 and 340 may be included in a single memory chip.

Figure 11:
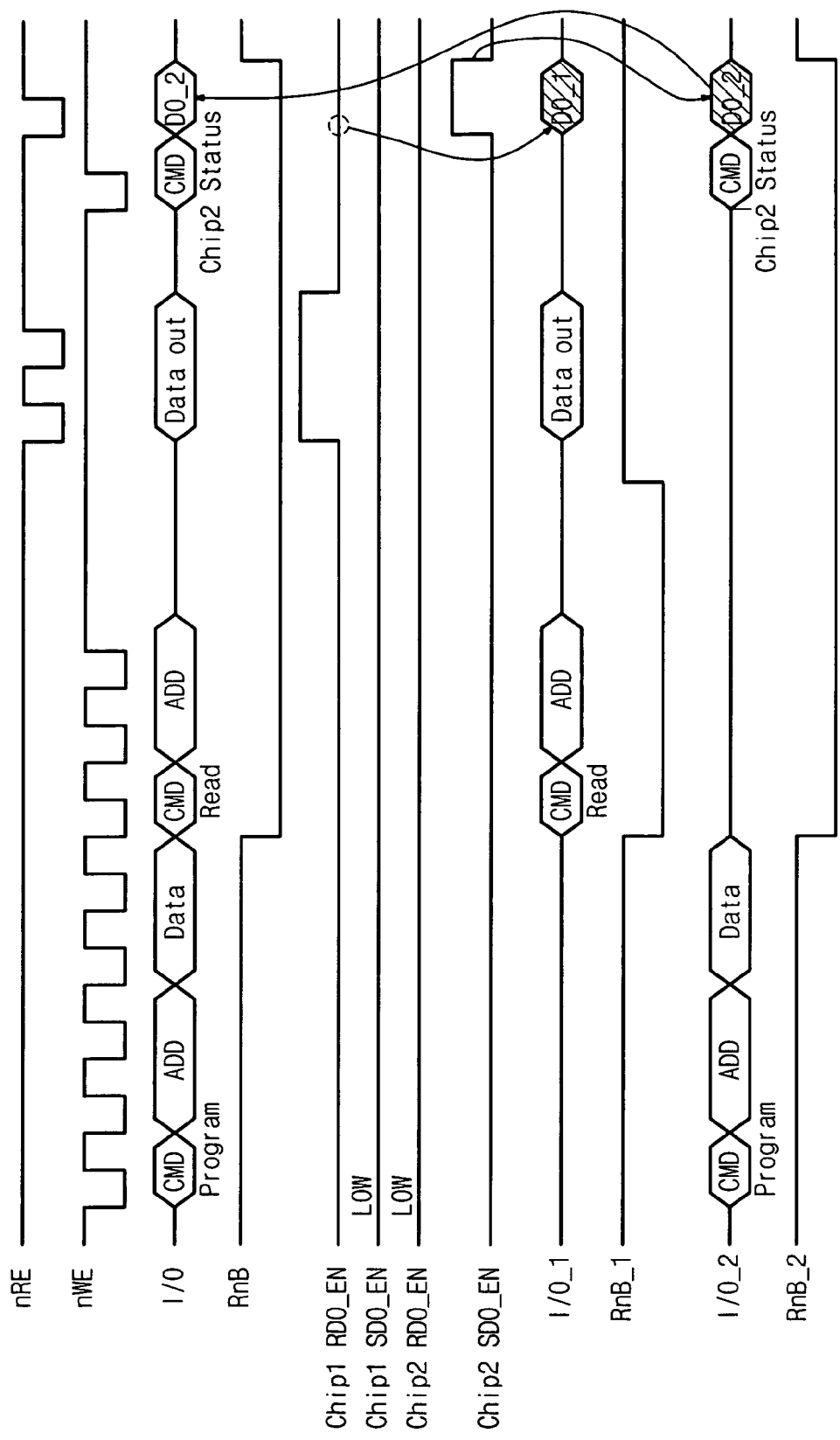
FIG. 11 is a timing diagram showing operations by the first and second buffer controllers in accordance with example embodiments.

FIG. 11 is an example timing diagram showing the data output operations through the I/O bus 110 by the first and second buffer controllers shown each in FIGS. 9 and 10 in accordance with example embodiments. FIG. 11 shows the procedure of outputting the status data DO_2 to the I/O bus 110 at the time of completing the programming for the second memory chip. Referring to FIG. 11, the read-data output enable signal Chip1 RDO_EN of the I/O buffer 250 may be inactivated at a time of activating the status-data output enable signal Chip1 SDO_EN that is applied to the I/O buffer 350. Thus, the read data DO_1 of the memory chip 200 does not collide with the status data DO_2 of the second memory chip 300 on the shared I/O bus 110. As a result, the status data DO_2 are transferred to the shared I/O bus 110 from the second memory chip 300. The memory controller 120 may use the status data DO_2 to determine whether the programming for the second memory chip 300 has been completed. By such a control sequence, it is possible for the multi-chip flash memory device of example embodiments to conduct interleaving copy-back operations with higher frequency and/or reliability.

As described above, example embodiments offer a multi-chip flash memory device operable with higher frequency and/or reliability by interleaving reading and programming in the same period during a copy-back operation under the condition of sharing an I/O bus therein.

The above-disclosed subject matter is to be considered illustrative, and not restrictive, and the appended claims are intended to cover all such modifications, and enhancements, and other example embodiments. Thus, to the maximum extent allowed by law, the scope of example embodiments is to be determined by the broadest permissible interpretation of the following claims and their equivalents, and shall not be restricted or limited by the foregoing detailed description.

What is claimed is:

1. A method of copying-back data in a multi-chip flash memory device having first and second memory chips, comprising:
reading first source data from a first source region of one of the memory chips;
programming the first source data into a target region included in one of the memory chips; and
reading second source data from second source region of the other memory chip different from the memory chip including the target region, wherein reading the second source data is carried out while programming the first source data, wherein
one of the memory chips includes,
a first input/output buffer storing status data, where the status data reports completion status of the programming in response to a status detection command and a read enable signal, and
a first buffer controller activating an output of the first input/output buffer, in response to the status detection command and an address, and
an other of memory chips includes,
a second input/output buffer storing the second source data, and
a second buffer controller interrupting the output of the second input/output buffer, in response to the status detection command.

2. The method as set forth in claim 1, wherein when the first source region and the target region are included in the first memory chip, the second source region is included in the second memory chip.

3. The method as set forth in claim 2, wherein reading the second source data includes detecting whether the first source data have been programmed into the target region.

4. The method as set forth in claim 1, wherein when the first source region is included in the first memory chip and the target region is included in the second memory chip, the second source region is included in the first memory chip.

5. The method as set forth in claim 4, wherein reading the second source data includes detecting whether the first source data have been programmed into the target region.

6. The method as set forth in claim 1, wherein the first and second source regions and the target region are correspondent each with data storage regions each of which is a unit of page.

7. The method as set forth in claim 1, further comprising:
correcting errors of the first and second source data read out.

8. The method as set forth in claim 1, wherein the first and second memory chips are NAND flash memory devices.

9. A multi-chip flash memory device comprising:
a first memory chip;
a second memory chip; and
a memory controller programming a target region of one of the first and second memory chips with first source data read out from the first memory chip during a copy-back operation, and regulating the first and second memory chips to read second source data from a second source region of the other memory chip different from the memory chip including the target region during a period of the programming, wherein
one of the first and second memory chips includes,
a first input/output buffer storing status data, where the status data reports completion status of the programming in response to a status detection command and a read enable signal, and
a first buffer controller activating an output of the first input/output buffer, in response to the status detection command and an address provided by the memory controller, and
an other of the first and second memory chips includes,
a second input/output buffer storing the second source data, and
a second buffer controller interrupting the output of the second input/output buffer, in response to the status detection command.

10. The multi-chip flash memory device as set forth in claim 9, wherein the first and second memory chips share a chip selection signal.

11. The multi-chip flash memory device as set forth in claim 10, wherein the first and second memory chips are alternatively selected in accordance with a level of the chip selection signal.

12. The multi-chip flash memory device as set forth in claim 9, wherein the memory controller executes an error correction operation for the first and second source data.

13. A multi-chip flash memory device comprising:
an input/output bus;
a first memory chip, during programming, providing status data, which reports completion status of the programming in response to a status detection command and a read enable signal;
a second memory chip, during programming, conducting a read to output read data to the input/output bus, before outputting the status data, in response to a read command and interrupting a data output to the input/output bus at an output time of the status data; and
a memory controller providing the first and second memory chips with the status detection command, the read command, and an address via the input/output bus and conducting a copy-back operation in accordance with the programming and reading, wherein
the first memory chip includes,
a first input/output buffer storing the status data, and
a first buffer controller activating an output of the first input/output buffer, in response to the status detection command and the address, and
the second memory chip includes,
a second input/output buffer storing the read data, and
a second buffer controller interrupting the output of the second input/output buffer, in response to the status detection command.

14. The multi-chip flash memory device as set forth in claim 13, wherein the first and second memory chips share a chip selection signal, a write enable signal, and a read enable signal which are provided from the memory controller.

15. The multi-chip flash memory device as set forth in claim 14, wherein the first and second memory chips are alternatively selected in accordance with a level of the chip selection signal.

16. The multi-chip flash memory device as set forth in claim 13, wherein the first memory chip includes:
a first cell array; and
a first control logic block conducting the programming for the first cell array in response to an address, a write enable signal, and a read enable signal and regulating to output the status data in response to the status detection command.

17. The multi-chip flash memory device as set forth in claim 16, wherein the first control logic block includes the first buffer controller.

18. The multi-chip flash memory device as set forth in claim 13, wherein the second memory chip includes:
a second cell array; and
a second control logic block conducting the reading for the second cell array in response to an address, a write enable signal, and a read enable signal and regulating an output of the second input/output buffer in response to the status detection command.

19. The multi-chip flash memory device as set forth in claim 18, wherein the second control logic block includes the second buffer controller.

* * * * *